United States Patent [19]

Quinn

[11] 4,056,713
[45] Nov. 1, 1977

[54] DISPLAY PROCESSING UNIT FOR DRAWING VECTORS

[75] Inventor: Robert J. Quinn, Millis, Mass.

[73] Assignee: Digital Equipment Corporation, Maynard, Mass.

[21] Appl. No.: 728,801

[22] Filed: Oct. 1, 1976

[51] Int. Cl.$^2$ .................... G06F 15/20; H01J 29/70
[52] U.S. Cl. ................................. 364/521; 315/367; 340/324 M; 364/607
[58] Field of Search .............. 235/151, 197, 152, 198, 235/150.5; 340/324 A, 324 AD, 172.5; 315/364, 367, 383, 384, 385

[56] References Cited

U.S. PATENT DOCUMENTS

| | | | |
|---|---|---|---|
| 3,539,860 | 11/1970 | Max et al. ............................ | 315/367 |
| 3,582,705 | 6/1971 | Waller et al. ......................... | 315/367 |
| 3,614,743 | 10/1971 | Ruben .......................... | 340/324 A X |
| 3,639,736 | 2/1972 | Sutherland .................. | 340/324 A X |
| 3,649,819 | 3/1972 | Waller .................................. | 235/151 |

Primary Examiner—Joseph F. Ruggiero
Attorney, Agent, or Firm—John M. Gunther; Thomas C. Siekman; Arthur W. Fisher

[57] ABSTRACT

A high speed display processing unit (DPU) for displaying vectors on a cathode ray tube is disclosed. Each vector to be displayed is classified as to whether it is virtual, visible or both. If the displayed vector is partially visible, a digital section of the DPU calculates the length of the visible portion of the vector. Prior to drawing the vector, the digital section determines the major axis of the vector and its tangent. Each of the above values is provided to an analog section of the DPU which then draws at a constant velocity the visible vector. The DPU also includes circuitry for scaling, offset calculations and light pen hits.

16 Claims, 6 Drawing Figures

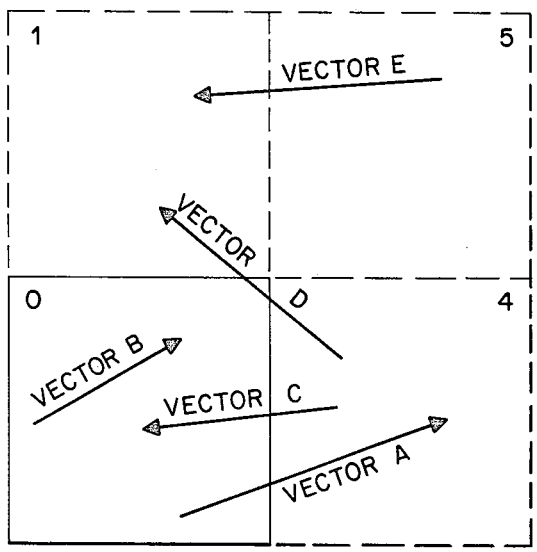
Fig. 1.
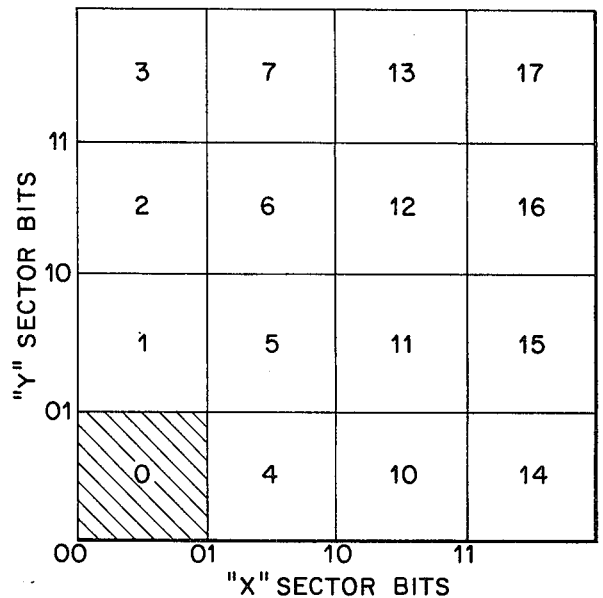
Fig. 4.
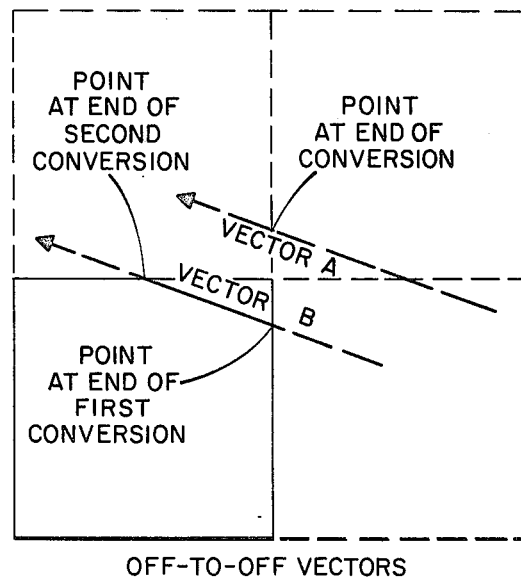
Fig. 5.
Fig. 6.
SCALE 1/2
OFF-TO-OFF VECTORS

ROM PATTERN

| INPUT | | | | | | | | OUTPUT | | | |
|---|---|---|---|---|---|---|---|---|---|---|---|
| X11 | X10 | Y11 | Y10 | X SUM 11 | X SUM 10 | Y SUM 11 | Y SUM 10 | POS/$\overline{POS}$ | EDGE | SUM EDGE | |
| 0 | 0 | 0 | 0 | 0 | 0 | 0 | 0 | 0 | 0 | 0 | 0 → 0 |
| 0 | 0 | 0 | 0 | 0 | 0 | 0 | 1 | 0 | 0 | 1 | 0 → 1 |
| 0 | 0 | 0 | 0 | 0 | 0 | 1 | 0 | 0 | 0 | 1 | 0 → 2 |
| 0 | 0 | 0 | 0 | 0 | 0 | 1 | 1 | 0 | 0 | 1 | 0 → 3 |
| 0 | 0 | 0 | 0 | 0 | 1 | 0 | 0 | 0 | 0 | 1 | 0 → 4 |
| ⋮ | ⋮ | ⋮ | ⋮ | ⋮ | ⋮ | ⋮ | ⋮ | ⋮ | ⋮ | ⋮ | |
| 0 | 1 | 0 | 0 | 0 | 0 | 0 | 0 | 0 | 1 | 0 | 4 → 0 |
| 0 | 1 | 0 | 0 | 0 | 0 | 0 | 1 | 0 | 1 | 1 | 4 → 1 |
| 0 | 1 | 0 | 0 | 0 | 0 | 1 | 0 | 0 | 1 | 1 | 4 → 2 |
| 0 | 1 | 0 | 0 | 0 | 0 | 1 | 1 | 0 | 1 | 1 | 4 → 3 |
| 0 | 1 | 0 | 0 | 0 | 1 | 0 | 0 | 1 | 1 | 1 | 4 → 4 |
| 0 | 1 | 0 | 0 | 0 | 1 | 0 | 1 | 1 | 1 | 1 | 4 → 5 |
| ⋮ | ⋮ | ⋮ | ⋮ | ⋮ | ⋮ | ⋮ | ⋮ | ⋮ | ⋮ | ⋮ | |
| 1 | 1 | 1 | 1 | 1 | 1 | 0 | 1 | 1 | 1 | 1 | 17 → 15 |
| 1 | 1 | 1 | 1 | 1 | 1 | 1 | 0 | 1 | 1 | 1 | 17 → 16 |
| 1 | 1 | 1 | 1 | 1 | 1 | 1 | 1 | 1 | 1 | 1 | 17 → 17 |

*Fig. 3.*

DISPLAY PROCESSING UNIT FOR DRAWING VECTORS

BACKGROUND OF THE INVENTION

1. Field of the Invention

This invention generally relates to display devices and more specifically to a device which enables straight lines on cathode ray tube screens or the like in response to digital data inputs.

2. Description of the Prior Art

Almost all of today's sophisticated graphic systems are capable of presenting information in a virtual drawing area that is larger than the visible drawing area on a display device. The ability to draw a larger picture than that which can be seen is known as windowing. In order to accomplish windowing, apparatus must be provided which eliminates those parts of the picture which fall outside the visible area.

One of the oldest and most inexpensive display systems capable of windowing is the incremental display. This system uses position registers which store information that is larger than the analog components used for controlling the display device. For example, when viewing FIG. 1, four sections which comprise a display area are shown. The lower left hand area is the visible display area while the other three areas shown in dotted lines are virtual display areas. As shown in FIG. 1, vector A starts in the visible area but ends in the virtual area. Vector A in this instance has a visible portion and also an invisible portion. The position registers in an incremental display would store information about the entire vector; however, the analog components of the incremental display would only be responsive to information in the visible area.

More specifically, the way in which the virtual area is accounted for is that the Cartesian coordinates defined in the position registers contains a larger number than that which can be shown on the screen area. For example, if a position register stores values having 12 bits, the digital-to-analog converter which outputs to the display would be responsive to only the lower 10 bits leaving the two upper bits of the binary number unaccounted for. These high order two bits of each axis are called sector bits and, when combined, would define one of the four areas shown in FIG. 1. Thus, the virtual drawing area for FIG. 1 is three times larger than the visible area.

In the particular example shown, when the position registers in the incremental display overflow, i.e., when the sector bits have a non-zero value, the intensity of the display is turned off; however, the vector would continue to be drawn into the virtual area. This is vector A to the right of the solid line.

The method used to window in incremental displays is known as blanking since the intensity of the display is blanked while the vector is being drawn off the visible area. The main drawback of incremental displays is speed. They are relatively slow and require the same amount of time to draw invisible vectors as they do to draw visible vectors.

A much faster method of vector generation is known as the stroke system. In this system an integrator is used to generate a ramp voltage which is then summed with position digital-to-analog converters (DAC's). The position DAC's in a stroke system holds the initial position of the beam on the screen and the ramp is used to generate the vector. Upon completion of the vector, the integrator is returned to zero and the position DAC's are updated to the end of the vector just drawn. This position is then the initial position of the next vector.

In the example shown in FIG. 1, the position DAC's would show the initial starting point of vector A. Upon the integrator generating a ramp voltage, the vector would be drawn from the starting point to the end of the visible portion of the screen. If blanking is used in this system, the analog circuitry must be capable of keeping track of the vector in the virtual area so that it can determine the position for re-entry back onto the display. This tracking makes for a very impractical system as the cost of the analog circuitry would be inordinately high since it would have to include sufficient power to keep track of vectors in the virtual area.

What is normally done in this situation, however, is that if the display has a vector which violates the edge of the visible portion, the vector is not drawn at all. The position registers are merely updated to keep track of the beam and only lines with both the start and the end points in the visible portion are drawn.

A technique known as clipping is used with stroke systems. Clipping is normally done in software and only the modified and visible data is presented to the display. The remaining portions outside the visible area are eliminated from the display file. Clipping routines are relatively slow and complex and require large data bases.

In the systems used above and one which had been previously used by Applicant's assignee and which was disclosed in U.S. Pat. No. 3,800,183, another major problem recognized was intensity variations when drawing a vector. This was caused by vectors of different angles drawing at different velocities. These prior systems utilize complex analog circuitry and approximation calculations in order to make the intensity of the vector constant. However, in spite of all the additional circuitry added by these devices, a truly constant intensity was never developed.

OBJECTS OF THE INVENTION

It is, therefore, an object of the present invention to provide a display processing unit which simplifies the drawing of vectors and which is fast and efficient.

It is another object of the invention to eliminate many of the analog components previously used in prior art devices.

It is yet a further object of the invention to provide a high-speed display processing unit which is a true, constant velocity display system.

It is yet another object of the invention to provide a display unit which clips vectors into visible portions and which generates these visible portions on the display itself.

SUMMARY

In accordance with the above objects, a display processor unit is disclosed which comprises a digital and an analog section. The digital section receives from a data device a vector to be drawn. The digital section initially determines whether a vector falls within the visible or virtual drawing area. When a vector includes both visible and virtual portions, the display processing unit utilizes a successive approximation register in combination with a read only memory (ROM) and binary multipliers to calculate the visible portions of the vector. Subsequently, the digital sections identify the larger axis of the vector and then calculate the tangent value for the vector. This tangent value is then used to control the slope of the vector drawn on the CRT. Additional features include scaling of the display area by either increasing or decreasing the value of the data sent by the data device; coordinating the light pen hits for identifying the location of a visible vector; and offsetting which allows repositioning of a vector in real time.

BRIEF DESCRIPTION OF THE DRAWINGS

FIG. 1: is a diagram showing the type of vectors which may be provided by a data device;

FIG. 3: is a diagram of the ROM pattern used for a drawing area of 16 blocks only one of which is the visible area;

FIG. 4: is a scale drawing showing one possibility of a virtual drawing area and its visible area;

FIG. 5: is a scale drawing of the diagram shown in FIG. 4; and

FIG. 6: is a drawing of one of the vector types as shown in FIG. 1 and namely the off-to-off vector type.

DETAILED DESCRIPTION OF THE PREFERRED EMBODIMENT

Figure 2:
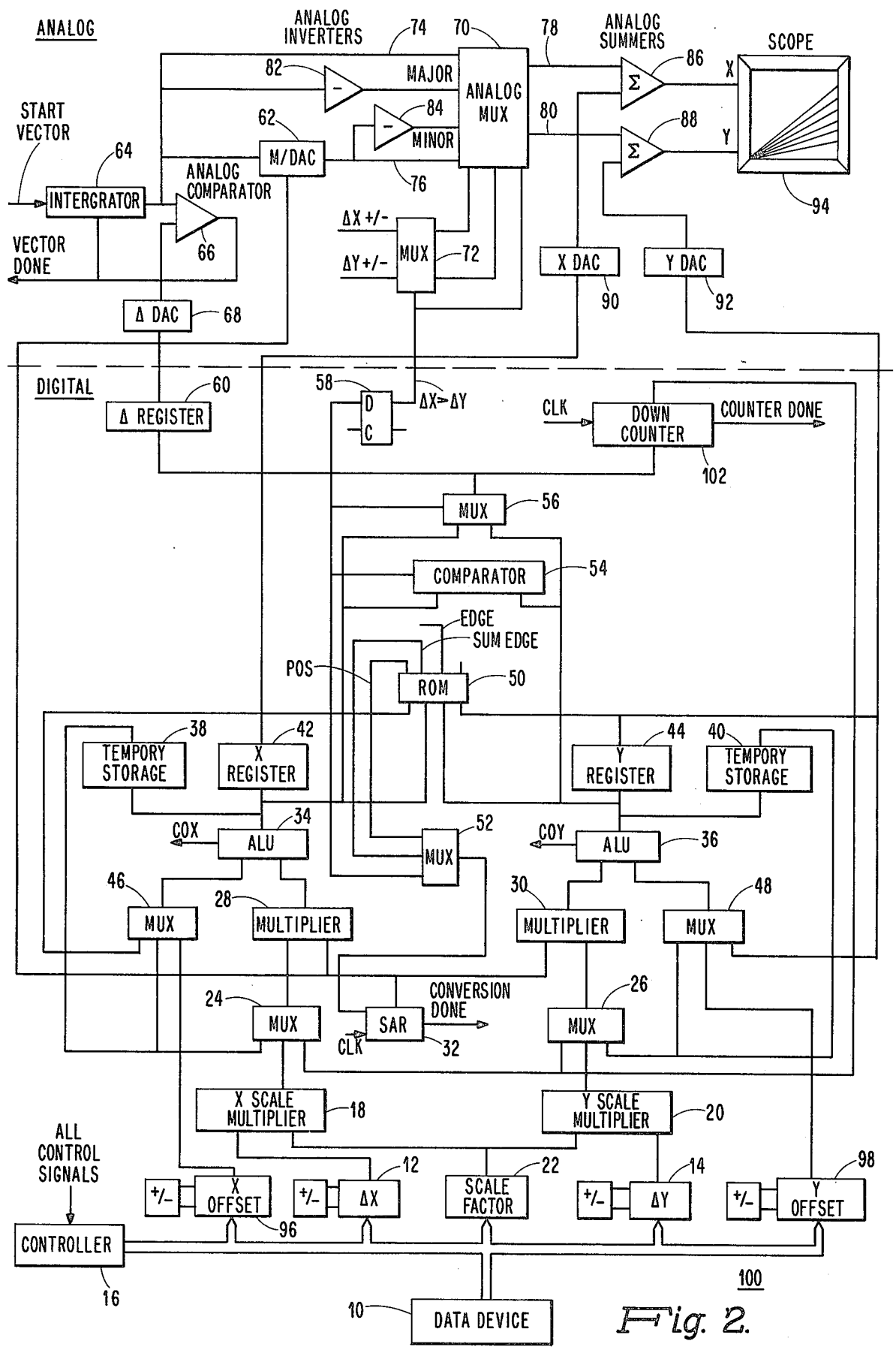
FIG. 2: is a schematic drawing of the display processing unit incorporating the features of the present invention.

As will become apparent, this invention may be applied to display system with retentive or non-retentive display screens. Examples of the former include X/Y plotters and cathode ray tubes (CRT) with retentive screens. Conventional CRT's are in the latter category as they must be refreshed by continuously retracing any given display on the screen at a rate which provides a persistent display. Although the following description merely discusses the operation for drawing one vector (i.e., line) at a time, it is recognized that the invention is applicable to drawing successive vectors for both retentive and non-retentive displays. Moreover, the invention can be applied to systems which draw circles or curves using a series of straight-line segments.

Referring to FIG. 1, a display screen is shown having a virtual area, a visible area and a number of vectors. The display processing unit (DPU) 100 shown in FIG. 2 accounts for these vectors and classifies them into four types: (1) on-to-on (i.e., the whole vector is within the visible area); (2) on-to-off (i.e., the vector begins in the visible area but ends in a virtual area); (3) off-to-on (i.e., the vector begins in a virtual area but ends in the visible area); and (4) off-to-off. These vectors are shown as vector B, vector A, vector C, respectively, for the first three types. With respect to type 4, off-to-off, two vectors are shown: vector D and vector E. Vector D both starts and finishes off the visible area; however, part of it hits the visible area and, therefore, is a possible visible vector of the off-to-off type. Vector E does not have any portion which is visible because it both starts and ends outside the visual area and, therefore, is impossible to be shown on the screen area.

Referring now to FIG. 2, the vector which is to be drawn is provided by a data device 10. Initially, it is desired to store the vector values in a register from which calculations can be made. Thus, data device 10 provides data into registers 12 and 14. Each register 12 and 14 stores the direction of the vector as indicated by the plus or minus sign as well as its length. For purposes of explanation, plus indicates up or to the right and delta X and delta Y are used to describe the length component.

After data device 10 has loaded the vector components into registers 12 and 14, it is then desired to store the coordinates of the end of the vector. Data device 10 then enables a ROM controller 16. As is well known in the art, ROM controller 16 is a microprogrammed device which controls the timing and transfer of data through discrete circuits. In the present description, ROM controller 16 controls the timing and transfer of data in DPU 100. Because or ROM controller may take many forms, only the functions performed by the ROM controller is disclosed, it being understood that a number of devices are capable of performing these functions. Obviously, these devices are microprogrammed to execute a series of steps unique to the given apparatus, this feature being one within the level of skill of an ordinary person in the art.

Once the components of the vector have been loaded into registers 12 and 14, the information is then transferred through scale multipliers 18 and 20. A scale multiplier is a binary multiplier which is a logic circuit designed to perform parallel binary multiplication. Scale multipliers 18 and 20 are responsive to a constant scaling factor that has been previously loaded into register 22 by data device 10. For purposes of explanation, it is assumed that the scale factor is set to unity and hence the scale multipliers multiply the data in registers 12 and 14 by one.

The delta length outputs from the scale multipliers 18 and 20 are provided to multiplexers 24 and 26 and then into multipliers 28 and 30. Multiplexers (MUX's) 24 and 26 have several inputs and in response to the ROM controller 16 allow only one of the inputs to be transferred, as is well known. At this point in time, the delta X length is one input to multiplier 28 and the delta Y length is one input to multiplier 30. Multipliers 28 and 30 are binary multipliers.

Both multipliers 28 and 30 have their other input responsive to the output of a successive approximation register (SAR) 32. Initially, the successive approximation register 32 stores a value equal to unity. This value is provided by ROM controller 16 to the SAR 32 at power-up. ROM controller 16 also provides other values to SAR 32 at other times as will be subsequently disclosed. With a unity value, multipliers 28 and 30 multiply by one the vector lengths transferred through MUX's 24 and 26 and provide their output to arithmetic and logic units (ALU's) 34 and 36.

The other input to ALU's 34 and 36 is the data in registers 42 and 44 which represents the starting coordinates of the vector. This data is passed through MUX's 46 and 48 by controller 16. At this time, the output of the ALU's contain the coordinates of the end of the vector. This data is then transferred to temporary storage registers 38 and 40.

At the same time that registers 38 and 40 are being loaded with the end coordinate of the vector, ROM 50 is being read by controller 16 to determine what type of vector is being drawn. ROM 50 is programmed with all the potential possibilities for drawing in the visible and virtual area. ROM 50 receives the starting sector from X and Y registers 42 and 44 as well as the end sector from ALU's 34 and 36. With these sectors, ROM 50 can make an initial decision as to the type of vector which is desired to be drawn.

For purposes of discussion, it is assumed that there are 16 sectors as shown by FIG. 4. Each one of these areas is defined by sector bits which are the highest two bits of each axis defining the vector's position. For purposes of discussion, the lower left hand sector of the area is considered to be the visible area while the remaining sectors (sectors 1-17) are the non-visible areas. ROM 50 stores data which can account for 256 possible vector combinations. This encompasses the possibility of any vector starting and ending in any sectors.

ROM 50 contains 256 words and hence is responsive to eight inputs, four of which define the starting sector and four defining the ending sector. These sector bits are provided from the X and Y registers 42 and 44 storing the initial sector and the output of ALU's 34 and 36 showing the ending sector. These sectors are clearly shown in FIG. 3.

In addition, ROM 50 has three outputs which are called POSSIBILITY, EDGE, and SUM EDGE. As shown in FIG 3, depending on the starting and ending sectors of the vector, these three outputs determine what type of vector is being drawn. Two of the signals from ROM 50 determine the four basic line types:

1. on-to-on — both EDGE and SUM EDGE not set;
2. on-to-off — EDGE not set and SUM EDGE set;
3. off-to-on — EDGE set and SUM EDGE not set;
4. off-to-off — both EDGE and SUM EDGE set.

If the vector is found to be of the off-to-off type, then the signal POSSIBILITY is checked to find out if the vector could draw through the visible area. If the vector is impossible, then the position registers are simply updated to keep track of the position. If there is a possibility of the vector having a visible portion, then controller 16 proceeds to do further calculations.

Reviewing FIG. 1 and interpreting this in light of FIG. 3, vector B, the initial starting position, and the ending position, i.e., the sum of the initial position plus the delta length, would both have the same sector bits, these sector bits being within the visible area. As a result, when ROM 50 received these inputs, it would indicate that the vector was entirely within the visible area. This is realized by ROM 50 providing a low EDGE signal and a low SUM EDGE signal, respectively, to ROM controller 16. For vector A, however, ROM 50 would receive a different sector bit from AlU 34. Looking at the ROM pattern in FIG. 3 and considering the sectors in FIG. 1 to be 0, 1, 4 and 5, the inputs from ALU 34 would have one of the four sector bits high. This shows that the vector is going from the 0 sector to the 4 sector. As a result, ROM 50 provides a low EDGE signal and a high SUM EDGE signal indicating that the vector is of the on-to-off type. Thus, when the SUM EDGE signal is provided (i.e. set), this indicates that the end of the vector is off the screen, but by having the SUM EDGE signal not provided (i.e., not set), this indicates that the end of the vector is in the visible area.

All the POSSIBLE vectors that may be created are accountd for by the ROM pattern in FIG. 3. For ease of understanding on the right hand side of FIG. 3, there is shown the beginning of the vector and its end, thus enabling the interpretation of the results for the EDGE and SUM EDGE.

In a particular example, it is assumed that an on-to-off vector has been provided. This type of vector will have an EDGE signal from ROM 50 which is low (i.e., not set). This indicates that the vectors' starting coordinate is on the screen. The SUM EDGE signal is high (i.e., is set) which indicates that the end coordinate of the vector is in the non-visible area. This information is then transferred into ROM controller 26. In response to this particular set of signals, ROM controller 16 begins a cycle to determine what the visible portion of the vector is. This cycle centers mainly around the operation of SAR 32.

SAR 32 has its value changed continually during the cycle as follows:

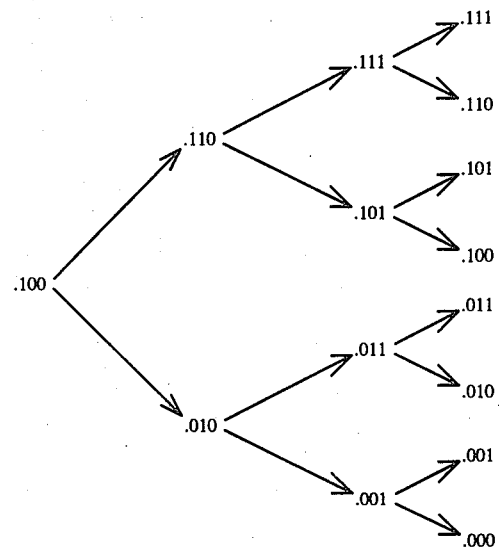

The SAR technique is well known and is used, for example, for A/D conversions.

Essentially, changing the SAR 32 enables the taking of selected points along the vector to determine whether each selected position is within or outside the visible area. To accomplish this, the SAR essentially divides the vector thereby changing the end point. ROM 50 then determines whether this end point is within or outside the visible area. Depending on the result, the value of the SAR is changed and another iteration is performed. In this way, the combination of SAR 32, ROM 50 and multipliers 28 and 30 calculates the visible portion of the vector. These iterations are based upon the output signals of ROM 50 via MUX 52 to the data input of SAR 32 and the results of the previous calculation. Thus, initially the ROM controller enables the SAR to have a value (SAR = 0.100) which cuts the vector in half and the ROM 50 then shows whether the midpoint of the vector is within the visible area. If it is within the visible area, then the next step is to determine whether three-quarters of the vector (i.e., SAR — 0.110) is within the visible area, etc. The above tables are shown for a three-bit digital number, it being recognized that the number of iterations and the bits involved in showing the area can be as detailed or simple as one wants.

More particularly, once the SAR register 32 is changed from unity one (1) to one-half (0.1), it provides this input into multipliers 28 and 30. Looking at the X vector only, it being recognized that the same calculations are performed for the Y vector, multiplier 28 receives as its other input the vector length which is stored in register 12 and transferred through scale multiplier 18 and multiplexer 24. The vector length is multiplied by one-half (0.1) and this value is added to the value in the X register 42 which is transferred through multiplexer 46 into ALU 34. ALU 34 provides this new sum into ROM 50, it being recognized that the initial position is also provided to ROM 50, and the ROM pattern, as shown in FIG. 3, then provides the signal SUM EDGE through MUX 52 to the data input of SAR 32.

If, for example, the SUM EDGE signal for half the vector length was not set, this would indicate that the half-way point of the vector was within the visible portion. As a result, the next iteration would determine whether three quarters of the vector was within the visible portion. If the SUM EDGE signal was set, this would indicate that one-half the vector was still too long and the next iteration would try one-quarter of the vector length to determine if this point of the vector was within the visible area.

It should be noted that throughout, the X and Y registers 42 and 44 store the initial position which is not changed and registers 12 and 14 store the vector length which is not changed. However, because of the calculations resulting from SAR 32 being continuously changed with each iteration, successively different points along the vector are taken so that a close approximation to the entire visible portion of the vector is made. Thus, what is going into ROM 50 during these iterations is the initial starting position plus the product of the vector length for the X and Y vectors, times a fraction which identifies a portion of the vector length.

At completion of the SAR iterations, the SAR will contain a factor that when multiplied by the original components of the vector will produce a modified vector that when added to the position registers will draw a line to the edge of the visual area.

At this time, the modified delta X and delta Y lengths are present at the output of the multipliers 28 and 30. Controller 16 now inhibits the data in position registers 42 and 44 from being transferred through MUX's 46 and 48. Hence the output of ALU's 34 and 36 will be this modified vector. This length data is presented to the inputs of comparator 54. The comparator output provides the larger value of the modified vector through MUX 56 and this value is then loaded into delta register 60 by controller 16. Also, at this time, flip flop 58 is loaded with the output of comparator 54, hence flip flop 58 indicates which axis is the larger.

It is now desired to store the larger value of the original vector component in down counter 102 for use in the POSSIBLE calculation of light pen hit coordinates. ROM controller 16 loads the SAR to unity and the data in registers 12 and 14 is then transferred through scale multipliers 18 and 20; through MUX's 24 and 26; and through multipliers 28 and 30 to one side of ALU's 34 and 36, the other side of ALU'34 and 36 being negated by controller 16 so that the ALU's transfer the vector components to the input of comparator 54; comparator 54 output gating the larger value through MUX 56 and this data is then transferred into down counter 102.

Once the larger component of the visible portion of the vector has been loaded into delta register 60 and the larger component of the original vector is loaded into down counter 102, the tangent of the vector is then calculated.

For purposes of discussion, it is assumed that the X axis is the major axis. What will then be drawn on the screen is the result of the delta X and delta Y vectors which is a hypotenuse of a right triangle. It can be specified by two mathematical components, one being the delta X component and the other being the delta Y component. The tangent of this vector can be calculated by the equation (tangent = minor axis)/major axis] where the tangent is a fraction. Since it is known which is the major axis, SAR 32 can be changed to provide the fraction which when multiplied times the major axis can equal the minor axis. Knowing what the major axis is, allows ROM controller 16 to inhibit either multiplier 28 or 30, i.e., the multiplier which is responsive to the SAR value. Thus, the major axis vector is multiplied by the fraction contained in the successive approximation register 32. This sum is then compared to the minor axis to determine what is the tangent.

More particularly, with the assumption that the X axis is the major axis, the output of register 12 is fed into multiplexer 24 which is enabled by the ROM controller 16 to transfer this value into multiplier 28. The successive approximation register 32 is initialized by the ROM controller 16 with the binary values disclosed previously when the visible portion of the vector on the screen was determined. Thus, SAR 32 initially starts with a one-half value (SAR = 0.100) and changes successively depending on the signals from comparator 54. More specifically, the output of multiplier 28 is provided into ALU 34 which has its other input inhibited. The output of ALU 34 is then provided to comparator 54. Comparator 54 then compares the major axis value (X axis) which is the SAR value times the delta X length to the minor axis value (Y axis) and provides a signal which indicates which value is greater.

For the Y axis value, the contents of register 14 is passed through the scale multiplier 20 to MUX 26. Controller 16 passes this value to one input of multiplier 30 and causes the multiplier to be non-responsive to the SAR's value. As a result, the minor axis value is multiplied by unity and passed to one input of ALU 36, the other input of ALU 36 being inhibited by controller 16. Therefore, ALU 36 provides to one side of the comparator 54 just the value of the Y component of the vector.

Comparator 54 passes its output through MUX 52 to the data input of SAR 32. Again, the iterations and the changing of the SAR 32 continue for a predetermined number of times until a fraction times the major axis approximately equals the minor axis. At completion of the SAR cycle, this fraction is the SAR is the tangent. At the end of the iterations, SAR 32 provides a CONVERSION DONE signal to the ROM controller and the value of the SAR is then transferred to an M DAC 62.

At this point in time, the major axis is known, the length of the larger component of the vector which is visible on the screen is known, the starting position for the vector is known, and the tangent is known. With this information, the analog portion of the display processor unit can then draw the visible vector.

More particularly, a signal from ROM controller 16 is provided to an integrator 64. An integrator is a device which upon being initiated generates a ramp voltage. Many integrators are available in the market today. The output of integrator 64 is provided to an analog comparator 66 which has as its other input an analog value from a delta DAC 68. A DAC, as is well known in the art, converts the absolute binary value of a digital number into its analog equivalent. In this case, delta DAC 68 is responsive to delta register 60 which stores the value of the major axis. As a result, delta DAC 68 converts this digital value into an analog voltage which is the other input to analog comparator 66. When the ramp voltage provided by integrator 64 equals the analog voltage provided by delta DAC 68, comparator 66 provides a VECTOR DONE signal to the ROM controller 16 indicating that the vector has been drawn.

The integrator 64 also provides its ramp voltage to an M DAC 62 which converts the ramp voltage into the minor axis voltage. The minor axis voltage is then provided as one input into an analog multiplexer 70. The other input to analog multiplexer 70 is an unmodified ramp voltage which corresponds to the major axis voltage. The analog multiplexer also receives an input from multiplexer 72. Multiplexer 72 receives its inputs from the direction bits of registers 12 and 14 which identify the direction of the vectors. In response to these direction signals, the analog multiplexer enables either the positive or inverted signal from the major and minor axes to be transferred. For example, if a vector is to be drawn up and to the right, multiplexer 72 would transfer signals indicating that both vectors are in the positive direction and as a result, the ramp voltage generated by integrator 64 would be provided over lines 74 and 76 through multiplexer 70 into lines 78 and 80. If, however, the X axis were negative, then the ramp voltage via inverter 82 would be transferred through the analog multiplexer. Similarly, if the Y axis were a negative direction, then the voltage through inverter 84 would be provided and the analog multiplexer would transfer its voltage over line 80.

It is noted that the above transfers were based on the X axis being the major axis. The ramp voltage for the minor axis or, in this situation the Y axis, is only a fraction of the major axis. To provide for the smaller Y value while still using the ramp voltage of integrator 64, an M DAC is used. The M DAC is responsive to the tangent provided by the successive approximation register 32. As is well known, an M DAC is a digital-to-analog converter which is intentionally designed to accept a varying reference. An M DAC is also known as a hybrid or multiplying DAC (M DAC), since the analog output is equal to the product of the binary input and the analog reference input.

Analog multiplexer 70 transfers the separate ramp voltages to analog summers 86 and 88. At its other input, analog summers receive inputs from X DAC 90 and Y DAC 92, respectively. X DAC 90 and Y DAC 92 identify the initial starting position of the vector and receive their input from the X and Y registers 42 and 44. The analog summers 86 and 88 thus add the separate ramp voltage as provided by the integrator 64 and changed for the minor axis by M DAC 62 to the initial position of the vector. As a result, analog summers 86 and 88 add the initial position which does not change to the ramp voltages which are changing.

The output of analog summers 86 and 88 is provided to scope 94. Scope 94 is initially receiving the starting positions through summers 86 and 88. This starting position then has the ramp voltages added to it. When the vector draws a length that is determined by the value in delta DAC 68, the ramp voltage is stopped since analog comparator 66 provides the vector done signal. At this time, the X and Y registers 42 and 44 are updated with the data held in temporary storage registers 38 and 40 which is the coordinates of the end of the vector.

If the vector ends in the virtual area then the output of the DAC's 90 and 92 are of no importance. When a vector is drawn that re-enters the visual area, then the DPU 100 will calcutle the point of entry and update DAC's to 90 and 92 to this location.

It should be noted that the analog devices are using the tangent of the slope of the vectors. This enables the vectors to be drawn at a constant velocity. As a result, the time when a vector is drawn depends only upon the length of the vector. Thus, as opposed to that done in the prior art where a vector's intensity varied based upon the angle of the vector, what is now being drawn is a constant velocity vector whose intensity is the same. This obviates many of the problems of the prior art.

Vectors of the on-to-on, off-to-on and off-to-off differ from the previously explained on-to-off vector only in the way that the data is loaded into the delta register 60 and the down counter 102 is calculated.

For vectors of the on-to-on type, it is apparent that the entire vector is visible and, therefore, the steps required to clip the vector are not necessary. Hence, the data that is loaded into delta register 60 and down counter 102 is simply the larger of the two values of the vector that is stored in registers 12 and 14.

If a vector is of the off-to-on type, the data in the temporary storage registers 38 and 40, which is the coordinate of the end of the vector, is transferred by controller 16 through MUX's 24 and 26; through multipliers 28 and 30; and through ALU's 34 and 36 into registers 42 and 44. Now the end coordinates are in both the temporary storage registers 38 and 40 and in position registers 42 and 44. Now an SAR cycle similar to the one used for the on-to-off vector is started, the only difference is that the direction bits are complemented. At completion of the SAR cycle, the output of ALU's 34 and 36 will contain the coordinates of the position for the vector entering the viewing area. At this time, the position registers 42 and 44 are updated to this location. Position DAC's 90 and 92 are responsive to the position registers 42 and 44 and position the beam of scope 94 at this location. At this time, the output of multipliers 28 and 30 contain the modified vector components which is the visible portion of the vector. Controller 16 then inhibits MUX's 46 and 48 from transferring data so that the output of ALU's 34 and 36 contain this modified vector. The delta register 60 is now loaded as was previously explained. The down counter 102 is also loaded at this time.

Vectors of the off-to-off type that could possibly have a visible portion must first be checked to find out if they truly violate the edge of the visual area. FIG. 6 shows two vectors called vector A and vector B. Both of these vectors start and end in the virtual section, but vector A does not have a visible portion. To determine if the vector truly violates the edge of the viewing area, the vector components in registers 12 and 14 are gated by controller 16 to one side of multiplier 28 and 30 as has been previously explained. The position registers 42 and 44 are gated through MUX's 46 and 48 to the ALU's 34 and 36. As SAR cycle is started and the output POSSIBILITY from ROM 50 is gated through MUX 52 to the input of SAR 32. The SAR first tries one-half (0.100). If this value generates an impossible vector, then three-quarters value is tried, etc. If one-half value generates a possible vector, then the SAR next tries one-quarter value, etc. At completion of the conversion cycle, the modified delta X and delta Y will have the end of the vector either on or off the edge of the visible area. If the end is not on the edge of the visible area, then the vector does not have a visible portion vector A of FIG. 6. At this time, the position registers 42 and 44 are updated with the data held in temporary storage registers 38 and 40 which is the coordinate of the end of the line.

If at the end of the conversion cycle the end of the vector is on the edge of the visible area, then this vector must have a visible portion. At this time, the position registers are updated to this coordinate which is the position at which the vector enters the viewing area, vector B of FIG. 6. A second SAR cycle is started and since the position registers have the starting coordinate of this new vector in the visible area, this vector appears as an on-to-off type and is handled as was previously explained for that type of vector.

The above steps of clipping of the vector was presented using only two-dimensional drawings. It should be noted that a third or Z axis can be treated as the same as the X and Y for presentation of three-dimensional drawings.

Until now, all data that has been sent to the display was in a relative format. A vector is drawn relative to some fixed position. When a vector is presented to the display, it is described by two components, delta X and delta Y, which is added to or subtracted from the starting position, which is an absolute coordinate. Position registers 42 and 44 always hold data that is absolute because they present their outputs to the X and Y position DAC's 90 and 92, which hold the beam of scope 94 at this absolute coordinate.

When absolute data is handled by the DPU or it is referred to as a point, DPY 100 is able to load the position registers 42 and 44 with point data that has been presented to it by data device 10. Initially, it may be desired to store the absolute coordinate values in a register from which calculations can be made. If this situation occurs, data device 10 provides this data into registers 12 and 14. The direction bits of these registers have no effect on this operation. Data device 10 then enables controller 16 to transfer this data through scale multipliers 18 and 20; through MUX's 24 and 26 and through multipliers 28 and 30 which multiply this data by unity. The outputs of multipliers 28 and 30 then present this data to one leg of ALU's 34 and 36, the other input of the ALU's being negated at this time. The output of the ALU's is then the same data that is present in registers 12 and 14. This point data is then passed into position registers 42 and 44. The X and Y DAC's 90 and 92 then position the beam of scope 94 to this coordinate.

If a succession of vectors is drawn relative to a fixed point and then if the fixed point's coordinate is changed, all the vectors that are referenced to this point will change position.

Most displayed data is much more complicated than the example just given. Most displayed data is made up of many subpictures all of which could contain absolute data points.

If software was to move a complicated picture so that, for example, data that is in the virtual area is to be moved into the visible area, then all of the absolute data points in the display file would have to be incremented, move up and/or to the right, or decremented, move down and/or to the left. This can become quite complicated in software, and the display may have to be stopped. Stopping the display destroys the illusion of motion.

This off-setting, also called translation, is easily accomplished in hardware if two registers are used to hold offset values that can be added to or subtracted from all absolute data that is sent from the data device.

In the present invention, two off-set registers 96 and 98 may be loaded from data device 10 with the amount of change that is desired.

The following describes the use of the X value offset; it being understood that symmetrical action is taken for the Y value offset. The value of the X offset in register 96 is provided through multiplexer 46 into ALU 43. Concurrently, the absolute value in register 12 is provided as the other input to an ALU 34 via scale multiplier 18, multiplexer 24 and multiplier 28, which also multiplies by unity. ALU 34 then sums the offset value to the absolute value which is then transferred into position register 42. Thus, all that is necessary to move a complicated picture is to change the constant held in the offset register.

Graphic applications often require complicated pictures to be displayed. Typically, a user may need to enlarge the picture to comprehend the finer details of a portion of the picture, or, alternatively, to shrink a picture to obtain an overview of the entire picture. FIG. 4 shows an area that is represented by a binary number having 12 bits with the lower left hand corner being the visible area. At this time only, the block (O) can be seen. If all the data sent to DPU 100 by data device 10 is divided in half, the picture as shown in FIG. 5 will be seen. If all the data is divided by four, all of the blocks shown in FIG. 4 will be seen in what is the cross hatched area shown as block 0 in FIG. 4. This is known as scaling, also called zooming. Obviously, any presentation may be provided depending on the user's needs. Though scaling is normally done in software, it is time-consuming and somewhat complicated. Scaling is easily accomplished by means of apparatus provided herein. Thus, all the data sent to DPU 100 by data device 10 is passed through binary multipliers 18 and 20 via registers 12 and 14. Multipliers 18 and 20 will then multiply this data by a constant scaling factor that has been provided to register 22 by data device 10. The scale multiplier provides multiples, such as $2^{-x}$, $2^{-2}$, $2^{-1}$, $2^0$, $2^1$, $2^x$, etc.

Presently, it is considered advantageous to have an interactive display. As a result, light pens are being used more frequently. A light pen is a light detector that facilitates user interaction with the display system. If a vector is drawn on the screen and a light pen detects light, the vector can be stopped and an interrupt sent to the data device 10.

It is desirable to read the Cartesian coordinate of the light pen hit. In a stroke system display, this information is very difficult to obtain because the only information available about a vector is the start and end points.

This problem is easily resolved in the instant apparatus since the vectors are drawn at a constant velocity and the tangent is known. If, for example, vector B in FIG. 1 is to be drawn, the absolute value of the larger component, delta X, in this example, has been loaded into down counter 102. The down counter is then clocked at the same rate that the vector is being drawn. When the vector is interrupted by the light pen hit, the down counter is stopped and the coordinate values of the light pen can then be determined by the following formula. The position of the light pen coordinate hit: X (hit) equals X (end point) minus down counter; Y (hit) equals Y (end point) minus (down counter) times (tangent). Down counter 102 stores the major axis value at the same time as the delta register 60 is loaded.

When the light pen detects light, a signal is sent to controller 16 which stops the down counter and resets the integrator. At this time, registers 42 and 44 contain the initial position and registers 38 and 40 contain the end coordinate. SAR 32 stores the tangent and the down counter stores the value that represents the amount of the major axis that is left to be drawn. To implement the formula, noting that in this example the X axis is the larger, controller 16 transfers the data in temporary storage register 38, which is the X end point, through MUX 46 to ALU 34 and the down counter's data is passed through MUX 24 into multiplier 28. Controller 16 makes multiplier 28 non-responsive to the value in the SAR. Hence, the output of multiplier 28 is the value that is in the down counter. ALU 34 then subtracts the value from multiplier 28 from the data from MUX 46 and then transfers this value to position register 42. Simultaneously, the data in temporary storage register 40, which is the Y end point, is transferred through MUX 48 is ALU 36. The down counter's value is passed through MUX 26 to multiplier 30, which multiplies this data by the tangent value that is held in SAR 32. Hence, the output of multiplier 30 is the down counter times the tangent. The ALU 36 then subtracts this value from the Y end point provided by register 40 and this is then loaded into position register 44. At this time, both the X and Y position registers 42 and 44 contain the coordinate of the light pen hit. This value is then made available to data device 10.

As is apparent, there are many modifications which can be made to the apparatus described. Therefore, it is the object of the appended claims to cover all such variations and modifications as come within the true spirit and scope of this invention.

I claim:

1. In a display system for drawing a vector, a display processing unit comprising:
   A. a digital section comprising:
      1. means for receiving the rectangular coordinates of said vector;
      2. means for storing the starting position of said vector;
      3. means responsive to said receiving means and said storing means for determining whether said vector may be drawn by said display system;
      4. means responsive to said determining means for comparing the length of the rectangular coordinates of said vector to determine which length is greater;
      5. means responsive to said receiving means and said determining means for calculating the tangent of said vector;
   B. an analog sector comprising:
      1. means for generating a ramp voltage;
      2. means responsive to said comparing means for inhibiting said generating means;
      3. means responsive to said calculating means for altering said ramp voltage from said generating means into separate voltages proportional to the tangent of said vector;
      4. means responsive to said separate voltages from said altering means and to a voltage responsive to said storing means for combining the magnitude of said voltages; and
      5. display means responsive to said combining means for displaying said vector.

2. The unit as defined in claim 1 wherein said determining means includes:
   A. first means for storing the possibilities of said virtual area and visible areas displayed by said displaying means;
   B. second means for adding the rectangular coordinates from said receiving means to the rectangular coordinates from said storing means;
   C. said first means in response to said output of said second means and said rectangular coordinates of said storing means indicating whether said vector may be displayed.

3. The unit as defined in claim 2 wherein said determining means further includes:
   A. iterative means for calculating the visible portion of said vector when a portion of said vector is within said visible area;
   B. third means for inhibiting said iterative means when said vector is fully within or fully outside said visible area;
   C. means responsive to said iterative means for providing to said inhibiting means the calculations results from said iterative means.

4. The unit as defined in claim 1 wherein said calculating means includes:
   A. fourth means responsive to said determining means for comparing one of said rectangular coordinates to the other;
   B. fifth means for determining if one of said rectangular coordinates is zero;
   C. sixth means responsive to said rectangular coordinates being zero for multiplying the larger of said rectangular coordinates by a fraction, said comparing means comparing said product from said multiplying means to the smaller of said rectangular coordinates;
   D. seventh means for enabling said sixth means to proceed for a predetermined number of multiplying operations.

5. The unit as defined in claim 1 wherein said determining means includes a read only memory which has been preloaded with the virtual area and the visible area for said display means and a successive approximation register for selectively limiting the length of said vector, the combination of said read only memory being responsive to said change vector altered by said successive approximation register resulting in said visible portion of said vector being calculated.

6. The unit as defined in claim 1 wherein said calculating means includes:
   A. a successive approximation register;
   B. means to modify the data stored by said successive approximation register;
   C. means to multiply said larger coordinate by the contents of said successive approximation register;
   D. means to compare said smaller coordinate to said product from said multiplying means;
   E. said modifying means in response to said comparing means, changing said data in said successive approximation register.

7. The process of displaying a vector on a display device, said process comprising the steps of:
   A. identifying the location of said vector with respect to the display area;
   B. determining the rectangular coordinates of said vector which are within said display area;
   C. comparing said rectangular coordinates of said vector to determine which is larger;
   D. determining the tangent of said vector; and
   E. generating an analog voltage to said display device, said analog voltages being responsive to said vector within said display area.

8. The process as defined in claim 7 wherein said identifying step includes the steps of:
   A. receiving the rectangular coordinates of said vector;
   B. storing the initial position of said vector; and
   C. calculating the end point of said vector.

9. The process as defined in claim 8 wherein said determining means includes the steps of:
  A. comparing said initial and end positions of said vector to said positions of said display area to classify said vector type;
  B. providing said end point of said vector to position registers if said vector type is impossible; and
  C. calculating said visible part if said vector type indicates a portion of said vector is visible.

10. The process as defined in claim 9 wherein said determining step includes:
  A. identifying whether said vector has changed for both said X and Y rectangular coordinates;
  B. multiplying a fraction times said larger axis if said vector has changed in both said X and Y rectangular coordinates;
  C. comparing said minor axis value to the product of said major axis times said fraction; and
  D. repeating steps B and C for a predetermined number of times.

11. The process as defined in claim 10 wherein said generating steps include:
  A. providing a ramp voltage;
  B. comparing said ramp voltage to a voltage corresponding to the major axis value;
  C. modifying by said tangent value the voltage provided for the minor axis;
  D. converting said voltage for the direction said vector is to be drawn;
  E. summing said converted voltage to a voltage identifying the vector's initial position; and
  F. inhibiting said providing means when said comparing means detects equal voltages.

12. The unit as defined in claim 1 wherein said digital section further includes:
  A. offset means for receiving offset values of said vector, said offset means coupled to said storing means for displacing the starting position of said vector the distance equal to said offset value.

13. The unit as defined in claim 1 wherein said digital section further includes:
  A. scaling means for altering the size of said vector by a scale multiplier, said scaling means coupled to said determining means, said scaling means upon receiving said vector from said determining means multiplying said vector by said scale multiplier.

14. The process as defined in claim 7 wherein said identifying step further comprises the step of multiplying said vector by a scale factor to alter the size of said vector with respect to said display device.

15. The process as defined in claim 8 wherein said identifying step includes the step of storing an offset value for offsetting the location of said vector, said identifying step calculating the end point of said vector as displaced by said offset value.

16. The process as defined in claim 7 and comprising the additional steps of:
  A. displaying said vector on said display device;
  B. interrupting said display step by placing a light pen at a point in said vector; and
  C. calculating the coordinates of said point in said vector where said light pen has interrupted said vector.

* * * * *